June 14, 1938.    F. G. CRAIG    2,120,323
BRAKE RIGGING
Filed Jan. 8, 1937    3 Sheets-Sheet 2
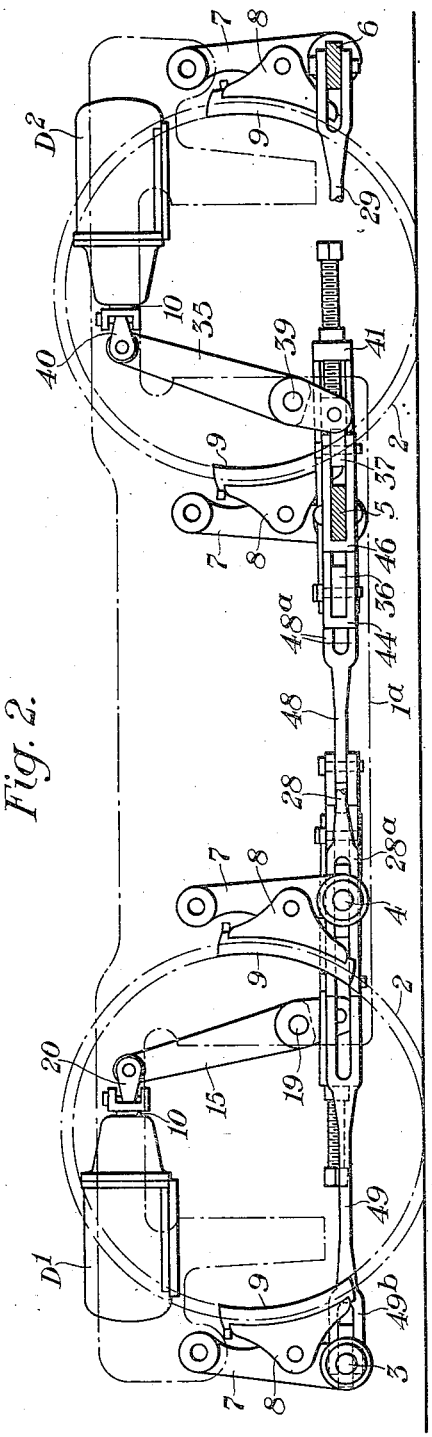
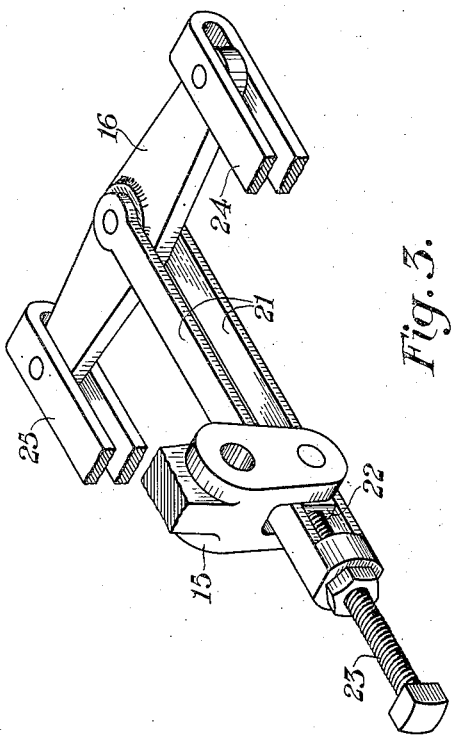
INVENTOR
Fred G. Craig.
BY
HIS ATTORNEY INVENTOR
Fred G. Craig.
BY
HIS ATTORNEY Patented June 14, 1938

2,120,323

UNITED STATES PATENT OFFICE 2,120,323

BRAKE RIGGING

Fred G. Craig, Wilmerding, Pa., assignor to The American Brake Company, Swissvale, Pa., a corporation of Missouri Application January 8, 1937, Serial No. 119,651

23 Claims. (Cl. 188—56)

My invention relates to brake rigging for railway vehicles, and particularly to brake rigging for locomotives wherein brake shoes are applied to both sides of each wheel.

One object of my invention is to provide a brake rigging of the type described wherein two separate and independent sets of interconnected rods and levers are provided, one for actuating the brake shoes which are located at the forward sides of the wheels, and another for actuating the brake shoes which are located at the rear sides of the wheels, whereby, if the brakes which are located on the one side of the wheels fail to function for any reason, an equalized braking effort will still result on each wheel from the brakes which are located on the other side of the wheels.

Another object of my invention is to provide a brake rigging of the type described, the operating parts of which are so located with respect to the adjacent parts of the vehicle as to permit the proper movement of the various parts of the rigging without interference with or by the adjacent parts of the vehicle.

Other objects of my invention will appear as the description proceeds.

I will describe two forms of brake rigging embodying my invention, and will then point out the novel features thereof in claims.

Figure 1:
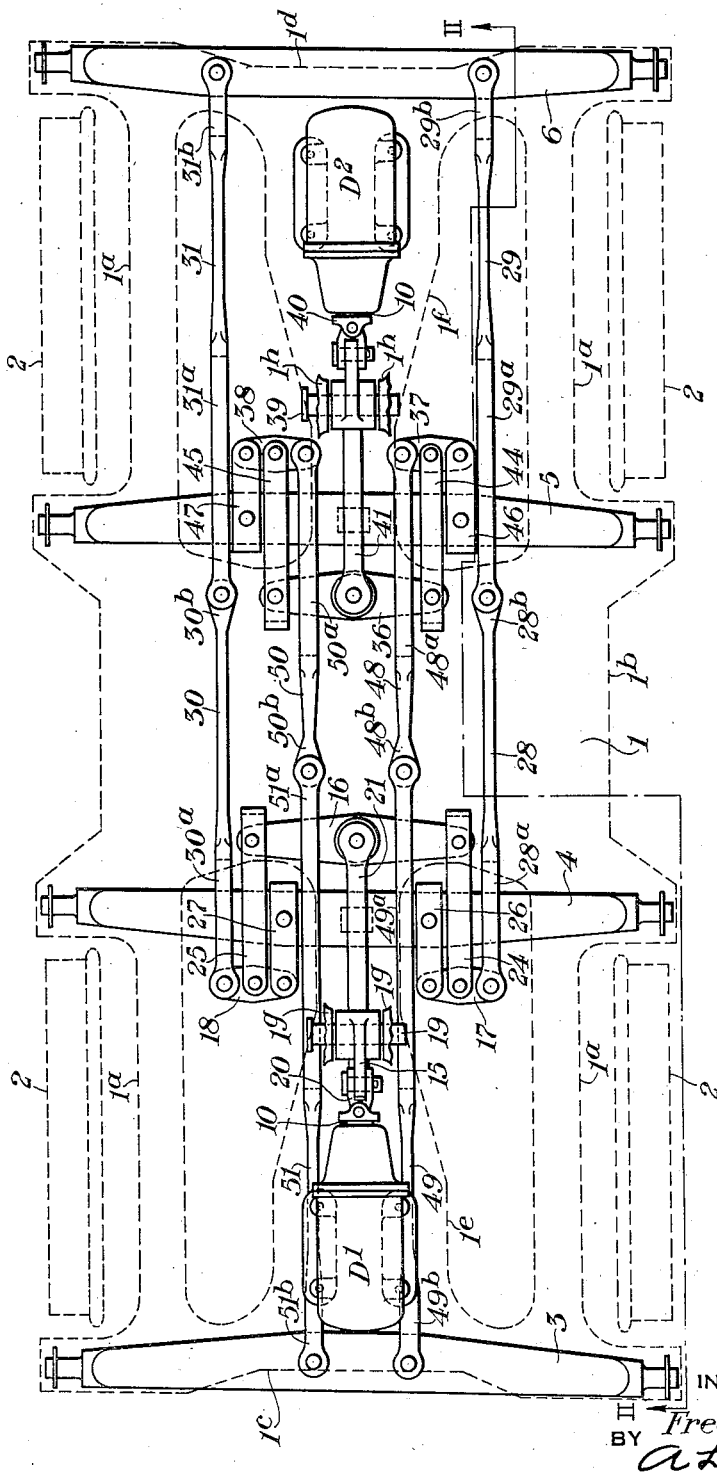
Figure 4:
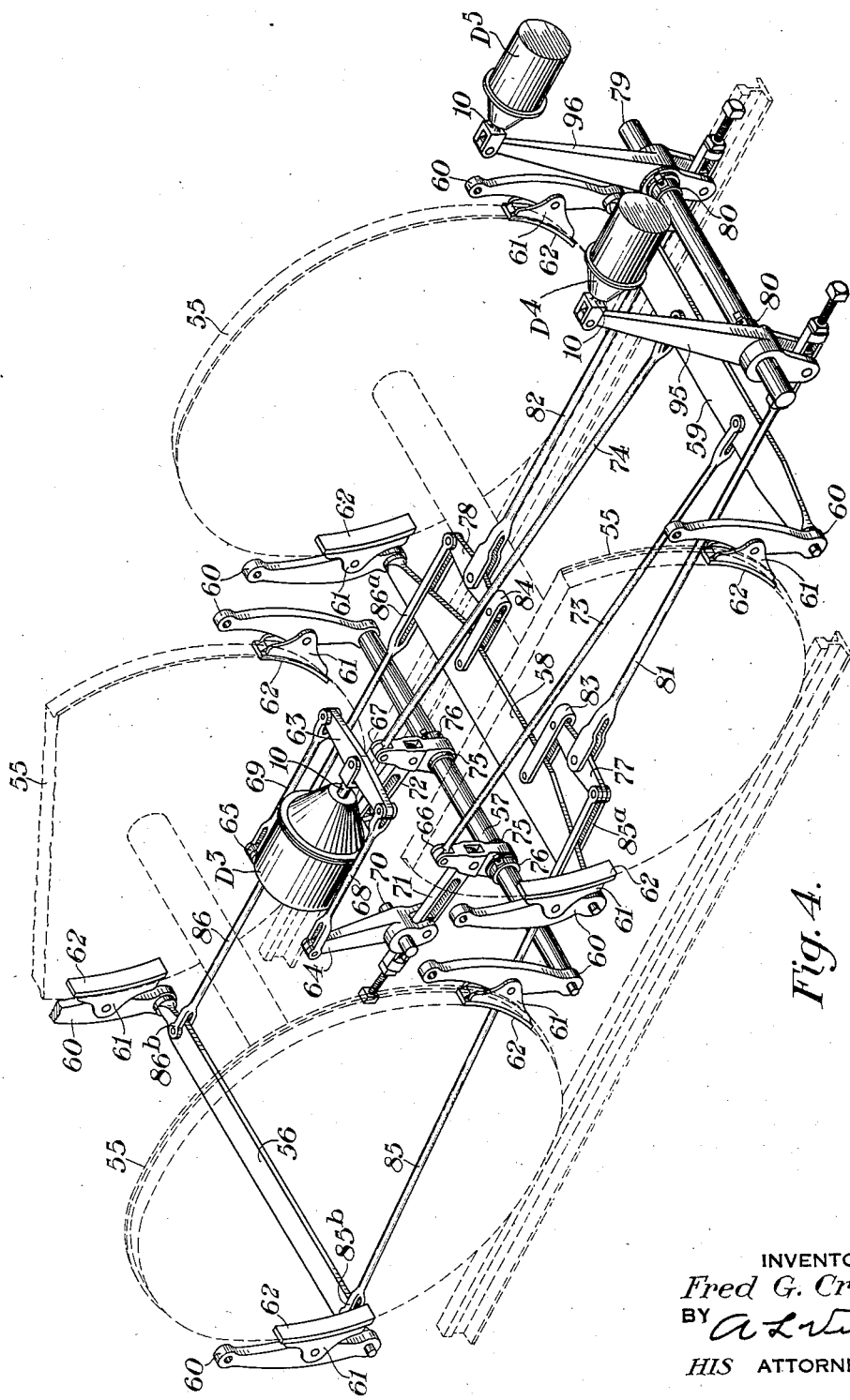

In the accompanying drawings, Fig. 1 is a top plan view showing brake rigging embodying my invention applied to a four-wheel engine truck, the usual hanger levers, brake heads, and brake shoes being omitted to simplify the drawing. Fig. 2 is a sectional view taken substantially on the line II—II of Fig. 1. Fig. 3 is a detail view showing, in isometric projection, a portion of the brake rigging illustrated in Figs. 1 and 2. Fig. 4 is a view showing, in isometric projection, brake rigging embodying my invention applied to the driving wheels of a locomotive.

Similar reference characters refer to similar parts in all four views.

Referring first to Figs. 1, 2, and 3, I have here shown brake rigging embodying my invention applied to a four-wheel engine truck having a truck frame 1. This truck frame may be of any desired construction, and as illustrated is of the usual cast metal type having longitudinally extending parallel side members $1^a$ connected by an integral bolster $1^b$ and integral end members $1^c$ and $1^d$. The truck frame 1 is supported by the wheels 2 in the usual and well-known manner.

The brake rigging comprises two brake beams 3 and 4 which extend transversely of the truck frame on opposite sides of the rear pair of wheels considerably below the axle, and two other brake beams 5 and 6 which extend transversely of the truck frame on opposite sides of the forward pair of wheels in the same horizontal plane as the brake beams 3 and 4. Each brake beam is movably supported at each end from the truck frame by means of hangers 7 carrying brake heads 8 provided with brake shoes 9 for engagement with the wheels.

The two brake beams 4 and 6 which are located at the forward sides of the two pairs of wheels are actuated, through the medium of a first set of interconnected rods and levers, by a first brake cylinder $D^1$, and the two brake beams 3 and 5 which are located at the rear sides of the two pairs of wheels are actuated, through the medium of a second set of interconnected rods and levers, by a second brake cylinder $D^2$. The brake cylinder $D^1$ is conveniently mounted on a longitudinally extending supporting member $1^e$ which is formed integrally with the rear end member $1^c$ and the bolster $1^b$ of the truck frame 1 midway between the two side members $1^a$ of the truck frame, and the brake cylinder $D^2$ is similarly mounted on a longitudinally extending supporting member $1^f$ which is formed integrally with the forward end member $1^d$ and the bolster $1^b$ of the truck frame 1 midway between the two side members $1^a$, both brake cylinders preferably being disposed at the longitudinal center line of the truck for reasons which will become apparent as the description proceeds. The two brake cylinders are of the usual type and each includes the usual cylinder portion, piston (not shown), return spring (not shown), and push rod 10 operated by the piston.

The set of operatively connected rods and levers which actuates the two forward brake beams 4 and 6 includes a vertically disposed brake cylinder lever 15, a horizontally disposed main equalizing lever 16, and two horizontally disposed auxiliary equalizing levers 17 and 18.

The brake cylinder lever 15 is pivotally supported intermediate its ends on a pivot pin 19 mounted in suitable spaced supports $1^g$ provided on the truck frame, and is operatively connected at its upper end with the push rod 10 of the brake cylinder $D^1$ by means of a clevis connection 20. The lower end of the lever 15 is operatively connected through the medium of a slack adjuster with one end of a strap link 21. The slack adjuster is of well-known construction and as shown in Fig. 3 comprises a fulcrum block 22 pivotally attached to the lever 15 and slidably mounted between the vertically spaced arms of the strap link 21, and an adjusting screw 23 screwed through the end of the link and cooperating with the fulcrum block to move the fulcrum block to different longitudinal positions and thus vary the effective length of the strap link. The strap link 21 straddles the brake beam 4 with sufficient clearance to permit free longitudinal movement of this link relative to the brake beam, and is pivotally connected at its free end with the center of the main equalizing lever 16.

The main equalizing lever 16 and the two auxiliary equalizing levers 17 and 18 are located adjacent the brake beam 4 on opposite sides of the brake beam in substantially the same horizontal plane as the brake beam, and the opposite ends of the main equalizing lever are operatively connected with the two auxiliary equalizing levers at or near their centers by means of strap links 24 and 25 which straddle the brake beam 4 with sufficient clearance to permit free longitudinal movement of these links relative to the brake beam. The inner end of the auxiliary equalizing lever 17 is pivotally connected to a member 26 which is rigidly secured to the brake beam 4, and the inner end of the auxiliary equalizing lever 18 is similarly connected to a member 27 which is also rigidly secured to the brake beam 4. The outer end of the auxiliary equalizing lever 17 is operatively connected, through the medium of two interconnected pull rods 28 and 29 arranged end to end, with the brake beam 6 adjacent one end thereof, and the outer end of the auxiliary equalizing lever 18 is operatively connected, through the medium of two interconnected pull rods 30 and 31 arranged end to end, with the brake beam 6 adjacent the other end thereof. The pull rod 28 is provided at the end which is connected to the equalizing lever 17 with a jaw 28$^a$ which straddles the brake beam 4 with sufficient clearance to permit free longitudinal movement of the pull rod relative to the brake beam, and at its opposite end with an eye 28$^b$. The pull rod 29 is provided at the end which is connected to the pull rod 28 with a jaw 29$^a$ which straddles the brake beam 5 with sufficient clearance to permit free longitudinal movement of this rod relative to the brake beam, and at the opposite end with a jaw 29$^b$ which receives the brake beam 6 with some clearance. The pull rods 30 and 31 are similar in construction to the pull rods 28 and 29, respectively, and the pull rod 30 is provided at the end which is connected to the lever 18 with a jaw 30$^a$ which straddles the brake beam 4 with sufficient clearance to permit longitudinal movement of the rod 30 relative to the brake beam 4, and at the opposite end with an eye 30$^b$; while the pull rod 31 is provided at the end which is connected to the rod 30 with a jaw 31$^a$ which straddles the brake beam 5 with sufficient clearance to permit longitudinal movement of the rod 31 relative to this brake beam, and at the opposite end with a jaw 31$^b$ which receives the brake beam 6 with some clearance.

The set of operatively connected rods and levers which actuates the brake beams 3 and 5 is essentially the same as the set just described and includes a vertically disposed brake cylinder lever 35, a horizontally disposed main equalizing lever 36, and two horizontally disposed auxiliary equalizing levers 37 and 38. The brake cylinder lever 35 is pivotally supported intermediate its ends on a pin 39 mounted in suitable supports 1$^h$ provided on the truck frame, and is operatively connected at its upper end with the push rod 10 of the brake cylinder D$^2$ by means of a clevis connection 40. The lower end of the lever 35 is operatively connected with one end of a strap link 41 by means of a slack adjuster which is similar in all respects to the slack adjuster which connects the lower end of the lever 15 with the strap link 21. The strap link 41 straddles the brake beam 5 with sufficient clearance to permit free longitudinal movement of this link relative to the brake beam, and is pivotally connected at its free end with the center of the main equalizing lever 36.

The main equalizing lever 36 and the two auxiliary equalizing levers 37 and 38 are located adjacent the brake beam 5 on opposite sides of this brake beam between the two pull rods 29 and 31 in substantially the same horizontal plane as the brake beam 5, and the opposite ends of the main equalizing lever 36 are operatively connected with the two auxiliary equalizing levers 37 and 38 at or near their centers by means of strap links 44 and 45 which straddle the brake beam 5 with sufficient clearance to permit free longitudinal movement of these links relative to the brake beam. The outer end of the auxiliary equalizing lever 37 is pivotally connected to a member 46 which is rigidly secured to the brake beam 5, and the outer end of the equalizing lever 38 is similarly pivotally connected to a member 47 which is also rigidly secured to the brake beam 5. The inner end of the auxiliary equalizing lever 37 is operatively connected, through the medium of two interconnected pull rods 48 and 49 arranged end to end with the brake beam 3 a little to one side of the center thereof, and the inner end of the auxiliary equalizing lever 38 is operatively connected, through the medium of two interconnected pull rods 50 and 51 arranged end to end, with the brake beam 3 a little to one side of the center thereof. The pull rod 48 is provided at the end which is connected to the equalizing lever 37 with a jaw 48$^a$ which straddles both the equalizing lever 36 and the brake beam 5 with sufficient clearance to permit free longitudinal movement of this pull rod relative to the equalizing lever and the brake beam, and at its opposite end with an eye 48$^b$. The pull rod 49 is provided at the end which is connected to the rod 48 with the jaw 49$^a$ which straddles the brake beam 4 and the equalizing lever 16 with sufficient clearance to permit free longitudinal movement of this rod relative to the brake beam 4 and the equalizing lever 16, and at the opposite end with a jaw 49$^b$ which receives the brake beam 3 with some clearance. The pull rods 50 and 51 are similar in construction to the pull rods 48 and 49, respectively, and the pull rod 50 is provided at the end which is connected to the equalizing lever 38 with a jaw 50$^a$ which straddles the equalizing lever 36 and the brake beam 5 with sufficient clearance to permit free longitudinal movement of the rod 50 relative to the equalizing lever 36 and brake beam 5, and at the opposite end with an eye 50$^b$, while the rod 51 is provided at the end which is connected to the rod 50 with a jaw 51$^a$ which straddles the brake beam 4 and equalizing lever 16 with sufficient clearance to permit free longitudinal movement of the rod 51 relative to these parts, and at the opposite end with a jaw 51$^b$ which receives the brake beam 3 with some clearance.

With the above described construction, it will be noted that all of the interconnected rods and levers of each set with the exception of the two brake cylinder levers 15 and 35 are located in the same plane as the brake beams, and are supported solely by the brake beams, thus eliminating the necessity for auxiliary supporting means, and hence greatly simplifying the mounting of the brake rigging on the engine truck.

When it is desired to apply the brakes, fluid under pressure is simultaneously supplied to both brake cylinders $D^1$ and $D^2$ through the usual air brake control means, thereby causing the pistons of these cylinders to move outwardly, and move the associated push rods 10 outwardly. The outward movement of the push rod 10 of the cylinder $D^1$ acts through the brake lever 15 and strap link 21 to apply power to the main equalizing lever 16, which power is transmitted by means of the strap links 24 and 25 to the auxiliary equalizing levers 17 and 18 in equal stresses, and from the auxiliary equalizing levers 17 and 18 to the forward brake beam 4 through the members 26 and 27, and to the forward brake beam 6 through the pull rods 28, 29, and 30, 31, thus applying all the brake shoes on the forward sides of the wheels with equal stresses. The outward movement of the push rod 10 of the brake cylinder $D^2$ similarly acts, through the brake lever 35 and strap link 41 to apply power to the main equalizing lever 36, which power is transmitted by means of the strap links 44 and 45 to the auxiliary equalizing levers 37 and 38 in equal stresses, and from the auxiliary equalizing levers 37 and 38 to the rear brake beam 5 through the members 46 and 47, and to the rear brake beam 3 through the pull rods 48, 49, and 50, 51, thus applying all the brake shoes on the rear sides of the wheels with equal stresses.

To release the brakes, the fluid which was previously supplied to the brake cylinders $D^1$ and $D^2$ is vented to atmosphere in the usual manner, thereby permitting the releasing springs within the brake cylinders to retract the pistons, and hence permitting the various parts of the brake rigging to move to their released positions.

Referring now to Fig. 4, I have here shown brake rigging embodying my invention arranged for use in connection with the driving wheels 55 of a locomotive of the type which is provided with two pairs of driving wheels, the various parts of the locomotive other than the driving wheels being omitted from the drawing to simplify the disclosure.

The brake rigging in the form here shown comprises four brake beams 56, 57, 58, and 59, two of which 56 and 57 are located at the rear and forward sides, respectively, of the rear pair of driving wheels, and the other two of which 58 and 59 are located at the rear and forward sides, respectively, of the forward pair of driving wheels 55.

The brake beams are movably supported adjacent each of their ends by means of hanger levers 60, and each hanger lever is provided with the usual brake shoe head 61 carrying a brake shoe 62 for engagement with the wheels. The hanger levers 60 are pivotally supported at their upper ends by suitable means (not shown) in accordance with standard practice.

The brake rigging also comprises two sets of operatively connected rods and levers, one for actuating the two brake beams 57 and 59 which are located at the forward sides of the two pairs of wheels, and the other for actuating the two brake beams 56 and 58 which are located at the rear sides of the two pairs of wheels.

The first mentioned set of operatively connected rods and levers includes a horizontally disposed main equalizing lever 63, two vertically disposed brake cylinder levers 64 and 65, and two vertically disposed auxiliary equalizing levers 66 and 67, and is actuated by a brake cylinder $D^3$ similar to the previously described brake cylinders $D^1$ and $D^2$ shown in Figs. 1 and 2.

The main equalizing lever 63 is pivotally connected at its center with the pushrod 10 of the brake cylinder $D^3$, and is operatively connected at its ends by means of two links 68 and 69 with the upper ends of the two brake cylinder levers 64 and 65, respectively.

The brake cylinder levers 64 and 65, in turn, are pivotally supported intermediate their ends on fixed pivot pins 70, only one of which is visible in the drawing, and are operatively connected at their lower ends with the auxiliary equalizing levers 66 and 67, respectively, intermediate their ends by means of links 71 and 72. The pivot pins 70 are adapted to be mounted in suitable supports (not shown) provided on the engine frame. Each of the links 71 and 72 is provided at the end which is connected with the associated brake cylinder lever with a slack adjuster similar to that shown in Fig. 3, and previously described in connection with Fig. 1.

The auxiliary equalizing levers 66 and 67 are pivotally supported at their lower ends on the brake beam 57, which brake beam is made round in cross section to facilitate journaling these equalizing levers on the brake beam, and these equalizing levers are connected at their upper ends by means of pull rods 73 and 74 with the brake beam 59 at points equally spaced from the ends of this brake beam. The auxiliary equalizing levers are spaced equal distances from the adjacent ends of the brake beam 57, and are held in the desired longitudinal positions on this brake beam by means of collars 75 and 76 one of which is located on each side of each equalizing lever. The inner collars 75 abut against shoulders provided on the brake beam, while the outer collars are secured to the brake beam by means of suitable set screws, or their equivalent.

The other set of operatively connected rods and levers includes two brake cylinder levers 95 and 96, and two equalizing levers 77 and 78. The brake cylinder levers 95 and 96 are pivotally supported intermediate their ends on a transverse shaft 79 which is adapted to be secured at its ends in supports (not shown) provided on the engine frame, and the upper ends of these levers are pivotally connected with the push rods 10 of two brake cylinders $D^4$ and $D^5$, which brake cylinders are also similar to the previously described brake cylinders $D^1$ and $D^2$ shown in Figs. 1 and 2. The brake cylinder levers are held in the proper positions on the shaft 79 by the shaft supports, and by two collars 80 one of which is secured to the shaft 79 adjacent the inner side of each brake cylinder lever.

The lower ends of the brake cylinder levers 95 and 96 are operatively connected with the equalizing levers 77 and 78 at their centers by means of two links 81 and 82, each of which links includes a slack adjuster similar to that shown in Fig. 3, and previously described in connection with Fig. 1.

The equalizing levers 77 and 78 are horizontally disposed, and are located at one side of the brake beam 58 adjacent the opposite ends thereof in substantially the same horizontal plane as the brake beam. The inner ends of these equalizing levers are pivotally connected to members 83 and 84 which are pivotally secured to the brake beam 58 at points equally spaced from the ends of this brake beam, while the outer ends of these levers are operatively connected through the medium of pull rods 85 and 86 with the brake beam 56 at points equally spaced from the ends of this brake beam. The pull rods 85 and 86 at the ends which are connected with the equalizing levers 77 and 78 are provided with jaws 85a and 86a which straddle the brake beam 58 with some clearance, and at the opposite end with jaws 85b and 86b which receive the brake beam 56 with some clearance. To provide the necessary vertical clearance between the rods 85 and 86 and the brake beam 57, and between the rods 81 and 82 and the brake beam 59, the hanger levers 60 which support the brake beam 58 are made somewhat shorter in length than the other hanger levers, thus causing the brake beam 58 to be disposed in a plane which is somewhat higher than the plane in which the other brake beams are disposed.

In operation, when fluid under pressure is simultaneously supplied to the brake cylinders D³, D⁴, and D⁵, as will be the case when it is desired to apply the brakes, the push rods 10 are all moved outwardly in the associated cylinders, and the outward movement of the push rod 10 of the cylinder D³ acts to apply power to the main equalizing lever 63. This power is transmitted from the main equalizing lever to the auxiliary equalizing levers 66 and 67 in equal stresses through the medium of the links 68 and 69, the cylinder levers 64 and 65, and the links 71 and 72, where it again divides and a part is transmitted directly to the beam 57, and the remainder to the beam 59 through the medium of the rods 73 and 74, thus applying all the brake shoes on the forward sides of the wheels with equal stresses. The outward movement of the push rods 10 of the brake cylinders D⁴ and D⁵ acts through the brake cylinder levers 95 and 96 and the pull rods 81 and 82 to apply equal pressure to the equalizing levers 77 and 78, which power is transmitted from these levers in equal stresses to the beam 58 through the medium of the members 83 and 84, and to the beam 56 through the medium of the pull rods 85 and 86, thus applying all the brake shoes on the rear sides of the wheel with equal stresses.

Upon the release of fluid under pressure from the various brake cylinders D³, D⁴, and D⁵, the release springs move the pistons of the brake cylinders to their release positions, thereby removing the force tending to press the brake shoes against the wheels, and hence releasing the brakes.

It should be particularly pointed out that with brake rigging constructed in accordance with my invention, the two sets of interconnected rods and levers and the associated brake cylinders are so designed that substantially equal braking forces are normally applied to both sides of each wheel. It should also be pointed out, however, that, if the one set of interconnected rods and levers fails to operate for any reason, an equalized braking force will still be applied to one side of each wheel.

Although I have herein shown and described only two forms of brake rigging embodying my invention, it is understood that various changes and modifications may be made therein within the scope of the appended claims without departing from the spirit and scope of my invention.

Having thus described my invention, what I claim is:

1. In a brake rigging for a vehicle having a plurality of pairs of wheels, in combination, a brake shoe disposed on each side of each wheel, fluid pressure operated means for moving all of the shoes on the forward sides of the wheels into engagement with the wheels, and other fluid pressure operated means for moving all of the shoes on the rear sides of the wheels into engagement with the wheels.

2. In a brake rigging of the clasp type for a vehicle having a plurality of pairs of wheels, the combination with the brake shoes, of a first linkage connected with all of the brake shoes on the forward sides of the wheels, a second linkage connected with all of the brake shoes on the rear sides of the wheels, and separate and independent means for actuating said two linkages.

3. In a brake rigging for a vehicle having a plurality of pairs of wheels, in combination, a plurality of brake beams one located on each side of each pair of wheels, fluid pressure operated means operatively connected with the brake beams on the forward sides of the wheels for actuating these brake beams, and other fluid pressure operated means operatively connected with the remaining brake beams for actuating such remaining brake beams.

4. In a brake rigging for a vehicle having a plurality of pairs of wheels, in combination, a plurality of brake shoes one disposed on each side of each wheel; a first set of equalizing levers, pull rods, hanger levers, and brake beams operatively connected with all of the shoes on the one side of each pair of wheels for actuating such brake shoes; and a second set of equalizing levers, pull rods, hanger levers, and brake beams operatively connected with all of the shoes on the other side of each pair of wheels for actuating these brake shoes.

5. In a brake rigging for a vehicle having a plurality of pairs of wheels, in combination, a plurality of brake shoes one disposed on each side of each wheel, two sets of equalizing levers, pull rods, hanger levers, and brake beams, one set operatively connected with the shoes on the one side of each pair of wheels, and the other set operatively connected with the shoes on the other side of each pair of wheels, and separate fluid pressure means for simultaneously actuating said two sets.

6. In a brake rigging for a vehicle having a plurality of pairs of wheels, in combination, a plurality of brake beams one located on each side of each pair of wheels, two brake shoes for each wheel one actuated by each of the associated brake beams, a first fluid pressure operated means operatively connected with the brake beams at the forward sides of the wheels in such manner that the associated shoes will all exert equal forces on the vehicle wheels, and a second fluid pressure operated means separate from said first fluid pressure operated means operatively connected with the brake beams at the rear sides of the wheels in such manner that the associated brake shoes will all exert equal forces on the vehicle wheels.

7. In a brake rigging for a vehicle having two pairs of wheels, in combination, four brake beams one located on each side of each pair of wheels, a first pair of equalizing levers each operatively connected at one end with the beam at the rear side of the forward pair of wheels and at the other end with the beam at the rear side of the rear pair of wheels, a second pair of equalizing levers each operatively connected at one end with the beam at the forward side of the forward pair of wheels and at the other end with the beam at the forward side of the rear pair of wheels, and fluid pressure operated means operatively connected with said equalizing levers intermediate their ends for actuating said levers to actuate said brake beams.

8. In a brake rigging for a vehicle having two pairs of wheels, in combination, four brake beams one located on each side of each pair of wheels, a first pair of equalizing levers each operatively connected at one end with the beam at the rear side of the forward pair of wheels and at the other end with the beam at the rear side of the rear pair of wheels, a second pair of equalizing levers each operatively connected at one end with the beam at the forward side of the forward pair of wheels and at the other end with the beam at the forward side of the rear pair of wheels, a first fluid pressure operated means operatively connected with the equalizing levers of said first pair intermediate their ends for actuating the two rear brake beams, and a second fluid pressure operated means operatively connected with the equalizing levers of said second pair intermediate their ends for actuating the two forward brake beams.

9. In a brake rigging for a vehicle having a plurality of pairs of wheels, in combination, a plurality of brake beams one located on each side of each pair of wheels, equalizing linkage connected with the brake beams on the forward sides of the wheels for actuating such brake beams, and other equalizing linkage connected with the brake beams on the rear sides of the wheels for actuating these brake beams.

10. In a brake rigging for a vehicle having a plurality of pairs of wheels, in combination, a plurality of brake beams one located on each side of each pair of wheels, two brake cylinders, equalizing linkage connecting the one brake cylinder with the brake beam on the forward side of each pair of wheels, and other equalizing linkage connecting the other brake cylinder with the brake beam on the rear side of each pair of wheels.

11. In a brake rigging, the combination with a truck frame and a plurality of pairs of wheels supporting said frame, of a plurality of brake beams one located on each side of each pair of wheels, two brake cylinders, one secured to the truck frame adjacent each end thereof, equalizing linkage connecting the brake cylinder at the rear end of the truck frame with the brake beam on the forward side of each pair of wheels, and equalizing linkage connecting the brake cylinder at the forward end of the truck frame with the brake beam on the rear side of each pair of wheels.

12. In a brake rigging for locomotives having a plurality of pairs of wheels, the combination of brake shoes disposed on both sides of each wheel, and two sets of interconnected equalizing levers, rods, brake beams, and hanger levers, one set for actuating the brake shoes at the forward sides of the wheels and the other set for actuating the brake shoes at the rear sides of the wheels, and separate and independent means for actuating said two sets.

13. In a brake rigging for locomotives having a plurality of pairs of wheels, the combination of brake shoes disposed on both sides of each wheel, and two sets of interconnected equalizing levers, rods, brake beams, and hanger levers, one set for actuating the brake shoes at the forward sides of the wheels and the other set for actuating the brake shoes at the rear sides of the wheels.

14. In a brake rigging for a vehicle having two pairs of wheels, in combination, four brake beams one located on each side of each pair of wheels, a first pair of equalizing levers each operatively connected at one end with the beam at the rear side of the forward pair of wheels and at the other end with the beam at the rear side of the rear pair of wheels, a second pair of equalizing levers each operatively connected at one end with the beam at the forward side of the forward pair of wheels and at the other end with the beam at the forward side of the rear pair of wheels, a first brake cylinder operatively connected with the two equalizing levers of said first pair intermediate their ends, and a second brake cylinder operatively connected with the two equalizing levers of said second pair intermediate their ends.

15. In a brake rigging for a vehicle having two pairs of wheels, in combination, four brake beams one located on each side of each pair of wheels, a first pair of equalizing levers each operatively connected at one end with the beam at the rear side of the forward pair of wheels and at the other end with the beam at the rear side of the rear pair of wheels, a second pair of equalizing levers each operatively connected at one end with the beam at the forward side of the forward pair of wheels and at the other end with the beam at the forward side of the rear pair of wheels, a plurality of links one operatively connected intermediate its ends with each of said equalizing levers, and brake cylinder means for operating said links.

16. In a brake rigging for a vehicle having two pairs of wheels, in combination, four brake beams one located on each side of each pair of wheels, a first pair of auxiliary equalizing levers each operatively connected at one end with the brake beam at the rear side of the rear pair of wheels and each operatively connected at the other end with the brake beam at the rear side of the forward pair of wheels, a first main equalizing lever operatively connected at its ends with the auxiliary levers of said first pair intermediate their ends, a second pair of equalizing levers each operatively connected at one end with the brake beam at the forward side of the rear pair of wheels and each operatively connected at the other end with the brake beam at the forward side of the forward pair of wheels, a second main equalizing lever operatively connected at its ends with the auxiliary equalizing levers of said second pair intermediate their ends, and actuating means for said two main equalizing levers connected with said levers intermediate their ends.

17. In a brake rigging for a vehicle having two pairs of wheels, in combination, four brake beams one located on each side of each pair of wheels, a first pair of auxiliary equalizing levers each operatively connected at one end with the brake beam at the rear side of the rear pair of wheels and each operatively connected at the other end with the brake beam at the rear side of the forward pair of wheels, a first main equalizing lever operatively connected at its ends with the auxiliary levers of said first pair intermediate their ends, a second pair of equalizing levers each operatively connected at one end with the brake beam at the forward side of the rear pair of wheels and each operatively connected at the other end with the brake beam at the forward side of the forward pair of wheels, a second main equalizing lever operatively connected at its ends with the auxiliary levers of said second pair intermediate their ends, a first brake cylinder operatively connected with said first main equalizing lever intermediate its ends, and a second brake cylinder operatively connected with said second main equalizing lever intermediate its ends.

18. In a brake rigging for a vehicle having two pairs of wheels, in combination, four brake means one located on each side of each pair of wheels, a first pair of auxiliary equalizing levers each operatively connected at one end with the brake beam at the rear side of the rear pair of wheels and each operatively connected at the other end with the brake beam at the rear side of the forward pair of wheels, a first main equalizing lever operatively connected at its ends with the auxiliary levers of said first pair intermediate their ends, a second pair of equalizing levers each operatively connected at one end with the brake beam at the forward side of the rear pair of wheels and each operatively connected at the other end with the brake beam at the forward side of the forward pair of wheels, a second main equalizing lever operatively connected at its ends with the auxiliary levers of said second pair intermediate their ends, a first brake cylinder operatively connected with said first main equalizing lever intermediate its ends, and a second brake cylinder operatively connected with said second main equalizing lever intermediate its ends, said equalizing levers all being located in the same horizontal plane as said brake beams and supported by said brake beams.

19. In a brake rigging for a vehicle having two pairs of wheels, in combination, four brake beams one located on each side of each pair of wheels, a first pair of auxiliary equalizing levers each operatively connected at one end with the brake beam at the rear side of the rear pair of wheels and each operatively connected at the other end with the brake beam at the rear side of the forward pair of wheels, a first main equalizing lever operatively connected at its ends with the auxiliary levers of said first pair intermediate their ends, a second pair of equalizing levers each operatively connected at one end with the brake beam at the forward side of the rear pair of wheels and each operatively connected at the other end with the brake beam at the forward side of the forward pair of wheels, a first brake cylinder operatively connected with said main equalizing lever intermediate its ends, and two other brake cylinders one operatively connected with each of the auxiliary levers of said second pair intermediate their ends.

20. In a brake rigging for a vehicle having two pairs of wheels, in combination, four brake beams one located on each side of each pair of wheels, first and second equalizing levers each journaled at one end on the brake beam at the forward side of the rear pair of wheels and each operatively connected at the other end with the brake beam at the forward side of the forward pair of wheels, first and second brake cylinder levers pivotally supported intermediate their ends and operatively connected at their lower ends with said first and second equalizing levers, respectively, intermediate their ends, a third equalizing lever operatively connected at its ends with the upper ends of said brake cylinder levers, a first brake cylinder operatively connected with said third equalizing lever intermediate its ends, fourth and fifth equalizing levers each operatively connected at one end with the brake beam at the rear side of the forward pair of wheels and at the other end with the brake beam at the rear side of the rear pair of wheels, third and fourth brake cylinder levers pivotally supported intermediate their ends and operatively connected at their lower ends with said third and fourth equalizing levers intermediate their ends, a second brake cylinder operatively connected with the upper end of said third brake cylinder lever, and a third brake cylinder operatively connected with the upper end of said fourth brake cylinder lever.

21. In a brake rigging for a vehicle having a plurality of pairs of wheels, in combination, a plurality of brake beams, one located on one side of one pair of wheels and another on the corresponding side of another pair of wheels, brake shoes adapted to be actuated by said beams into and out of braking engagement with the wheels, a lever carried by one of said two beams and being rockable about said one beam as an axis and operable to actuate both of said two beams, and means for actuating said lever.

22. In a brake rigging for a vehicle having a plurality of pairs of wheels, in combination, a plurality of brake beams, one located on one side of one pair of wheels and another located on the corresponding side of another pair of wheels, brake shoes adapted to be actuated by said beams into and out of braking engagement with the wheels, an equalizing lever pivotally mounted at one end on one of said beams for rotation about said one beam as an axis and operatively connected at its opposite end with the other beam, and means operatively connected with said equalizing lever intermediate its ends for actuating said lever to actuate both of said beams.

23. In a brake rigging for a vehicle having a plurality of pairs of wheels, in combination, a plurality of brake beams, one located on one side of one pair of wheels and another located on the corresponding side of another pair of wheels, brake shoes adapted to be actuated by said beams into and out of engagement with the wheels, a pair of equalizing levers pivotally mounted at one end on one of said brake beams at points equally spaced from the ends of the beam for rotation about said one beam as an axis and operatively connected at their opposite ends with the other beam at points equally spaced from its ends, and means operatively connected with said equalizing levers intermediate their ends for actuating said levers to actuate both of said beams.

FRED G. CRAIG.